Aug. 15, 1950
F. BELDI
2,518,518
APPARATUS FOR TESTING ELECTRICAL WINDINGS
IN AN INSULATING LIQUID
Filed Oct. 20, 1947
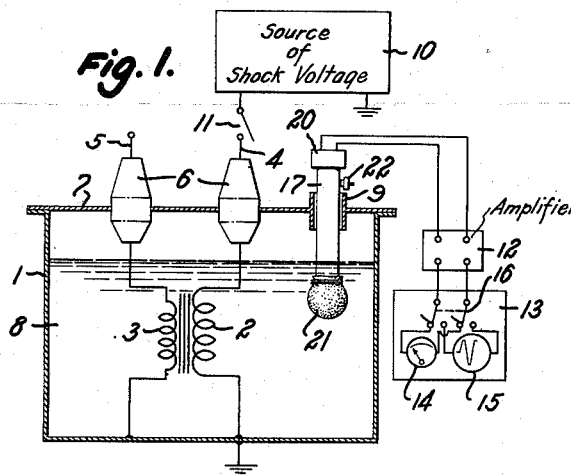
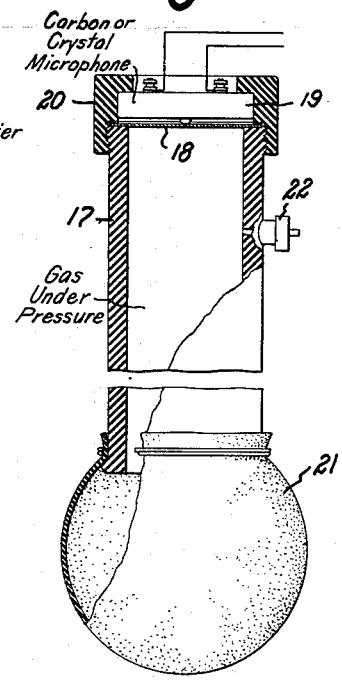
Inventor
Fritz Beldi,
By
Pierce, Scheffler + Parker,
Attorneys.

Patented Aug. 15, 1950

2,518,518

UNITED STATES PATENT OFFICE 2,518,518

APPARATUS FOR TESTING ELECTRICAL WINDINGS IN AN INSULATING LIQUID

Fritz Beldi, Baden, Switzerland, assignor to Aktiengesellschaft Brown, Boveri & Cie, Baden, Switzerland, a joint-stock company Application October 20, 1947, Serial No. 780,802
In Switzerland November 6, 1946

3 Claims. (Cl. 175—183)

This invention relates to apparatus for locating faults in the insulation of an electrical winding located in an insulating liquid, for example a transformer in a tank filled with an insulating liquid.

The testing of such windings with shock voltages is of great importance but, as is well known, it has been very difficult to obtain an indication of insulation faults by this method. The voltage surges have a steep front rising to a maximum value in about 1 microsecond and a half-wave duration period of about 50 microseconds, and the changes in voltage conditions set up by such shock voltages occur so rapidly that damage to the winding insulation can not be identified with certainty by direct observation of a cathode ray oscilloscope coupled to the winding under test. Oscillograms or photographic records of the changing image on the screen of the oscilloscope must be prepared and carefully studied, but it is not possible to recognize all of the changes in curve shape which are due to minor defects or partial penetrations of the insulation. Various methods have therefore been proposed to identify insulation faults which may have been produced during the shock voltage testing, for example an additional testing under low frequency voltages. This method does not afford reliable results, however, as some insulation faults escape detection even at test voltages up to 2.5 times the normal voltage.

It has been proposed to connect an indicating device in series with the winding which is subjected to the shock voltage, but these indicating devices react only to a major fault, such as a flash-over from the winding to ground, which results in an increase in the normally heavy current of the voltage surge.

A further method of testing with shock voltages is based upon the use of a measuring circuit with resonance characteristics which is coupled directly or indirectly to the winding under test. Measuring apparatus employing this method is described and claimed in my copending application Ser. No. 749,582, filed May 21, 1947, now abandoned, and it affords a very sensitive testing for insulation faults when the measuring circuit is energized by a coupling coil on the core of the winding under test or in close proximity to the same.

Objects of the present invention are to provide sensitive apparatus for detecting faults in the insulation of windings located in an insulating liquid, which apparatus does not require auxiliary coils on the core of the electrical apparatus or probe coils adjacent the core or the windings. Objects are to provide testing apparatus in which insulating faults are located by identifying pressure surges set up in the insulating liquid by an electric discharge at the fault point. Further objects are to provide testing apparatus of the character stated in which the pressure surges are transformed into electrical surges by an electroacoustic method and apparatus, the electrical surges being transmitted to an indicating device, such as a measuring instrument or cathode ray oscilloscope outside the tank in which the winding is located.

These and other objects and the advantages of the invention will be apparent from the following specification when taken with the accompanying drawings in which:

Fig. 1 is a diagrammatic view of an electrical device, specifically a transformer, and of apparatus for carrying out the new testing process, and Fig. 2 is an elevation on a larger scale, and with parts in section, of the electro-acoustic transformer which is shown schematically in Fig. 1.

In Fig. 1, of the drawing, the reference numeral 1 identifies a grounded metal tank in which a transformer comprising a high voltage winding 2 and low voltage winding 3 is located. The details of the transformer form no part of the invention and for simplicity, it may be assumed that the windings are grounded on the tank 1 and have high voltage terminal connections 4, 5 respectively which extend through conventional insulating bushings 6 mounted on the cover 7 of the tank. The tank is filled with insulating liquid or "transformer oil" 8 to a desired level above the windings, the liquid being introduced through an opening 9 in the cover 7 and the filling opening being normally closed by a combined cap and vent, not shown. The voltage surges for testing are imposed upon the winding 2 from a source of shock voltage 10 when switch 11 is closed.

Electrical discharges which occur during shock voltage testing at points of defective or inadequate insulation give rise to pressure surges in the insulating liquid 8, and an electro-acoustic device converts such pressure surges into electrical impulses which, after amplification in an electronic amplifier 12, produce visual indications or a record of the pressure surges at indicating apparatus 13. As indicated schematically, the indicating apparatus may include a sensitive measuring instrument 14 and a cathode ray oscilloscope 15, and a three-position switch 16 for connecting either or both of these indicating devices to the amplifier 12.

As shown in Fig. 2, the electro-acoustic device comprises a tube 17 of insulating material closed at its upper end by a diaphragm 18 which is a part of, or which transmits vibrations to, a microphone 19 of the carbon powder or crystal type. The tube 17, diaphragm 18 and microphone 19 may be connected in any convenient manner, for example by a flanged sleeve 20 which is threaded upon the upper end of the tube. The lower end of the tube 17 is closed by a thin and elastic diaphragm 21 which is expanded into the form of a ball by introducing a pressure gas at the valved inlet tube 22 after the tube 17 is inserted into the tank 1 through the filling opening 9. The lower end of tube 17 and the balloon-like diaphragm 21 are below the liquid level in tank 1, and pressure surges in the liquid are transmitted to the diaphragm 18 through the flexible diaphragm 21 and the air column within the tube 17.

The electro-acoustic method of detecting electrical discharges is very sensitive as the indicating apparatus 13 provides visual indications for faults or electrical discharges which can always be distinguished with certainty and with great accuracy from the normal or no-fault indications.

The great advantage of the new process is that, in addition to its high sensitivity, it does not require a coupling coil on the core of the winding under examination, or a probe coil which usually can be inserted only after removal of the cover of the tank. The insulating tube of the electro-acoustic transformer of this invention can be inserted through the conventional oil filling opening 9 of the tank, and the electrical transmission from the microphone to the indicating device is of simple construction and can be readily shielded from disturbing fields when the testing apparatus is employed to indicate electrical discharges due to excess voltages during operation of the electrical apparatus. If pressure surges are set up in the liquid by mechanical vibration or other causes, their effects can be eliminated by placing electrical filters in the leads from the microphone.

It is to be understood that the invention is not limited to the apparatus as shown and described, and that other arrangements which may be employed in carrying out the process fall within the spirit and scope of the invention as set forth in the following claims.

I claim:

1. Apparatus for testing electrical windings for defective or inadequate insulation by impressing thereon shock voltages of steep wave front and transient duration; said apparatus comprising a tank containing an insulating liquid and within which a winding may be placed and submerged in the liquid, a cover for said tank having an opening therethrough, a rigid tube of insulating material extending through said opening of the cover and having its lower end below the liquid level in said tank, a diaphragm extending across and closing the outer end of said tube, microphone means actuated by vibration of said diaphragm to develop an electrical current, indicating means responsive to currents developed by said microphone means, an elastic diaphragm secured across and closing the submerged end of said tube, and gas under pressure within said tube and expanding said elastic diaphragm to ball form, whereby pressure surges set up within the tank by electrical discharges are transmitted by said elastic diaphragm and the pressure gas to said first diaphragm to vibrate the same.

2. Apparatus as recited in claim 1, in combination with a valved inlet tube opening into said rigid tube of insulating material at a point above said tank cover, whereby pressure gas may be introduced into said input tube after introduction of the same into the tank.

3. Apparatus as recited in claim 1, wherein said indicating means includes a measuring instrument, an oscilloscope, and switch means for connecting either or both of said measuring instrument and said oscilloscope to said microphone means.

FRITZ BELDI.

REFERENCES CITED

The following references are of record in the file of this patent:

UNITED STATES PATENTS

| Number | Name | Date |
|---|---|---|
| 1,624,412 | Horton | Apr. 12, 1927 |
| 1,917,087 | Blume et al. | July 4, 1933 |
| 2,032,904 | Bellaschi | Mar. 3, 1936 |
| 2,194,303 | Germeck | Mar. 19, 1940 |
| 2,321,424 | Rohats | June 8, 1943 |